(12) United States Patent
Ben-Artzi et al.

(10) Patent No.: US 8,533,691 B2
(45) Date of Patent: Sep. 10, 2013

(54) MANAGING NON-COMMON FEATURES FOR PROGRAM CODE TRANSLATION

(75) Inventors: Guy Ben-Artzi, Palo Alto, CA (US); Yotam Shacham, Palo Alto, CA (US); Yehuda Levi, Rishon Lezion (IL)

(73) Assignee: Beek Fund B.V. L.L.C., Dover, DE (US)

( * ) Notice: Subject to any disclaimer, the term of this patent is extended or adjusted under 35 U.S.C. 154(b) by 292 days.

(21) Appl. No.: 13/023,678

(22) Filed: Feb. 9, 2011

(65) Prior Publication Data

US 2012/0204160 A1 Aug. 9, 2012

(51) Int. Cl.
*G06F 9/45* (2006.01)
(52) U.S. Cl.
USPC .......................................................... 717/137
(58) Field of Classification Search
None
See application file for complete search history.

(56) References Cited

U.S. PATENT DOCUMENTS

| | | | | |
|---|---|---|---|---|
| 5,898,874 A * | 4/1999 | Gelfenbain | .................. | 717/140 |
| 6,728,950 B2 * | 4/2004 | Davis et al. | .................. | 717/136 |
| 7,814,467 B2 * | 10/2010 | Li et al. | ......................... | 717/151 |
| 2005/0144598 A1 * | 6/2005 | Sabadell et al. | .............. | 717/137 |
| 2008/0222616 A1 * | 9/2008 | Cheng et al. | .................. | 717/137 |
| 2009/0260083 A1 * | 10/2009 | Szeto et al. | ..................... | 726/22 |
| 2011/0067009 A1 * | 3/2011 | Hosokawa et al. | .......... | 717/132 |
| 2011/0314451 A1 * | 12/2011 | Baumann et al. | ............. | 717/125 |

* cited by examiner

*Primary Examiner* — Don Wong
*Assistant Examiner* — Daxin Wu
(74) *Attorney, Agent, or Firm* — Novak Druce Connolly Bove + Quigg LLP

(57) ABSTRACT

Embodiments of the invention may involve managing translation of a source code of a computer application in a first programming language to a target code in a second programming language, at a processing device. A pre-translation analysis of the source code may be performed to determine a part of the source code that is not supported in the second programming language. Thereafter, a report may be generated for indicating modifications to the determined part of the source code. Subsequently, the determined part of the source code may be modified based on the report to generate an intermediate code.

41 Claims, 6 Drawing Sheets

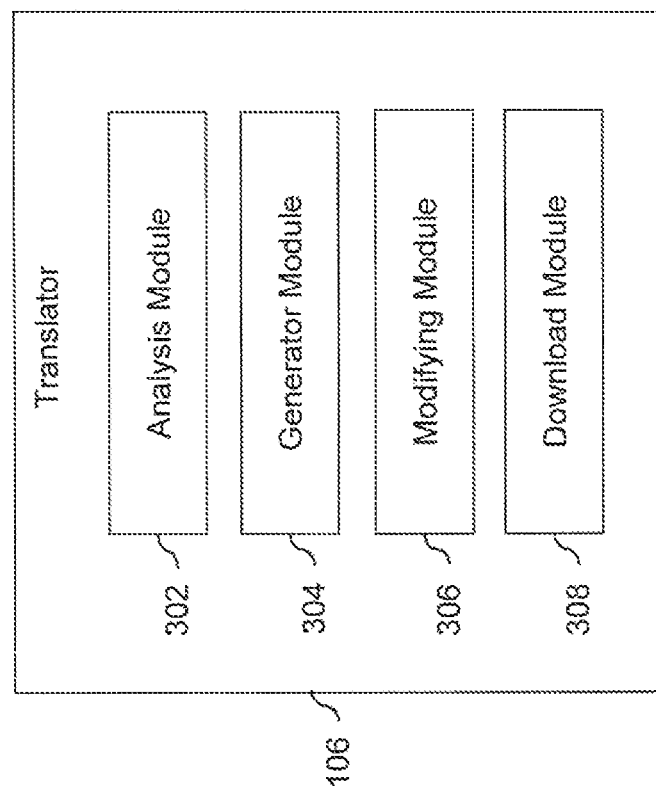

MANAGING NON-COMMON FEATURES FOR PROGRAM CODE TRANSLATION

FIELD OF THE INVENTION

Embodiments of the invention may relate to computer aided translation of programming code and may more specifically relate to managing non-common features in program code translation.

BACKGROUND OF THE INVENTION

Various users across the globe communicate or perform various activities on computer and device networks. Moreover, the users interact with each other through the networks, such as the Internet. Typically, the users use devices like personal computers to interact over the Internet. The users can interact from various Internet websites or social networking sites, for example, Facebook, Myspace, Hi5, and Orkut etc. Recently, the development in mobile devices such as cell phones, smartphones and PDAs, computers, laptops and the like has enabled them to be used for performing various activities on networks such as the Internet. Moreover, the mobile devices can be used for real-time interaction with other users on the network. The interaction or communication can be in the form of chatting, playing interactive online games, browsing, shopping, music, video, banking, business and the like.

The rapid pace of innovation in technology has generated various types of devices and platforms. Moreover, the number of devices is increasing rapidly. For example, there are various operating systems available for the devices such as Windows, Linux, Macintosh, Android, and Symbian, etc. Moreover, a large number of J2ME platforms are available for the mobile devices such as cell phones. Furthermore, the mobile devices have a wide range of capabilities in terms of screen size, screen type, screen resolution, processor, and memory etc. The applications for these devices have to be developed based on their platforms. Therefore, each application has to be ported to other platforms. For example, in case of computer games the programming languages typically used are JAVA, C#, C++, Action Script, and the like. Therefore, an application developed in Action Script programming language may have to be ported to another programming language when not supported by a device platform. Further, new applications are being continuously developed for different device platforms.

Generally, it may be desirable to translate a program code written in a source computer language for a source Operating System (OS) or device platform into multiple target computer languages for various target operating systems or device platforms. However, the translation may be difficult to perform duo to various challenges. One of the major challenges is to manage feature conflicts between the 'source language and the source OS' pair and the 'target language and the target OS' pair. For example, a language feature such as 'For statement' is available in both C++ and JAVA programming languages. However, the feature of 'Operator Overloading' is available in C++ but absent in JAVA. Therefore, the source program code written in C++ that uses 'Operator Overloading' may be difficult or impossible to be translated to JAVA automatically. Further, there may be various lines, modules, or snippets of source code that may not be automatically translatable to the target code. Such lines, modules, snippets, methods or functions may be referred to as non-common features.

Generally, a programmer may be required to read and understand the source code to introduce changes so that translation can be performed. Further, in case of automatic translation by Computers, the non-common features may be removed from the source code to generate partial target code. As a result, the target code may be rendered non-functional. Therefore, the programmer may be required to read and understand the partial code to make it functional.

The programmers must test the changes made in the source code to ensure proper functionality. Further, regression tests may be performed on the source code to check the functionality. Generally, the source code may be tested and regression tested in a test environment that is designed for the source code and source platform pair. However, the same test harness is not functional in the target code and target platform pair. Therefore, the programmer may be required to put a lot of effort for building test environments and conducting tests. Therefore, the testing of the program code results in a lengthy and time-consuming translation process. Further, the time and effort required increase exponentially with the number of target codes and platforms. As a result, the existing techniques are not scalable.

In light of the above discussion, techniques are therefore desirable to manage non-common features during program code translation.

SUMMARY

Embodiments of the invention may provide a method for managing translation of a source code of a computer application in a first programming language to a target code in a second programming language, at a processing device. The method may comprise: performing a pre-translation analysis of the source code to determine at least a part of the source code that is not supported in the second programming language; generating at least one report for indicating one or more modifications to the determined part of the source code; and modifying the determined part of the source code based on the report to generate an intermediate code.

Embodiments of the invention may further provide a system for managing translation of a source code of a computer application in a first programming language to a target code in a second programming language. The system may comprise: means for performing a pre-translation analysis of the source code to determine at least a part of the source code that is not supported in the second programming language; means for generating at least one report for indicating one or more modifications to the determined part of the source code; and means for modifying the determined part of the source code based on the report to generate an intermediate code.

Embodiments of the present invention may further provide an apparatus for managing translation of a source code of a computer application in a first programming language to a target code in a second programming language. The apparatus may comprise: a memory for storing one or more code snippets; and a processor communicatively coupled to the memory, wherein the processor is configured to: perform a pre-translation analysis of the source code to determine at least a part of the source code that is not supported in the second programming language; generate at least one report for indicating one or more modifications to the determined part of the source code; and modify the determined part of the source code based on the report to generate an intermediate code.

Embodiments of the present invention may further provide a computer-readable medium having stored thereon instructions that, if executed by a processor, cause the processor to execute a method for managing a translation of a source code, in a first language, to a target code, in a second language. The instructions may comprise: performing a pre-translation analysis of the source code to determine at least a part of the source code that is not supported in the second programming language; generating at least one report for indicating one or more modifications to the determined part of the source code; and modifying the determined part of the source code based on the report to generate an intermediate code.

BRIEF DESCRIPTION OF THE DRAWINGS

Figure 1:
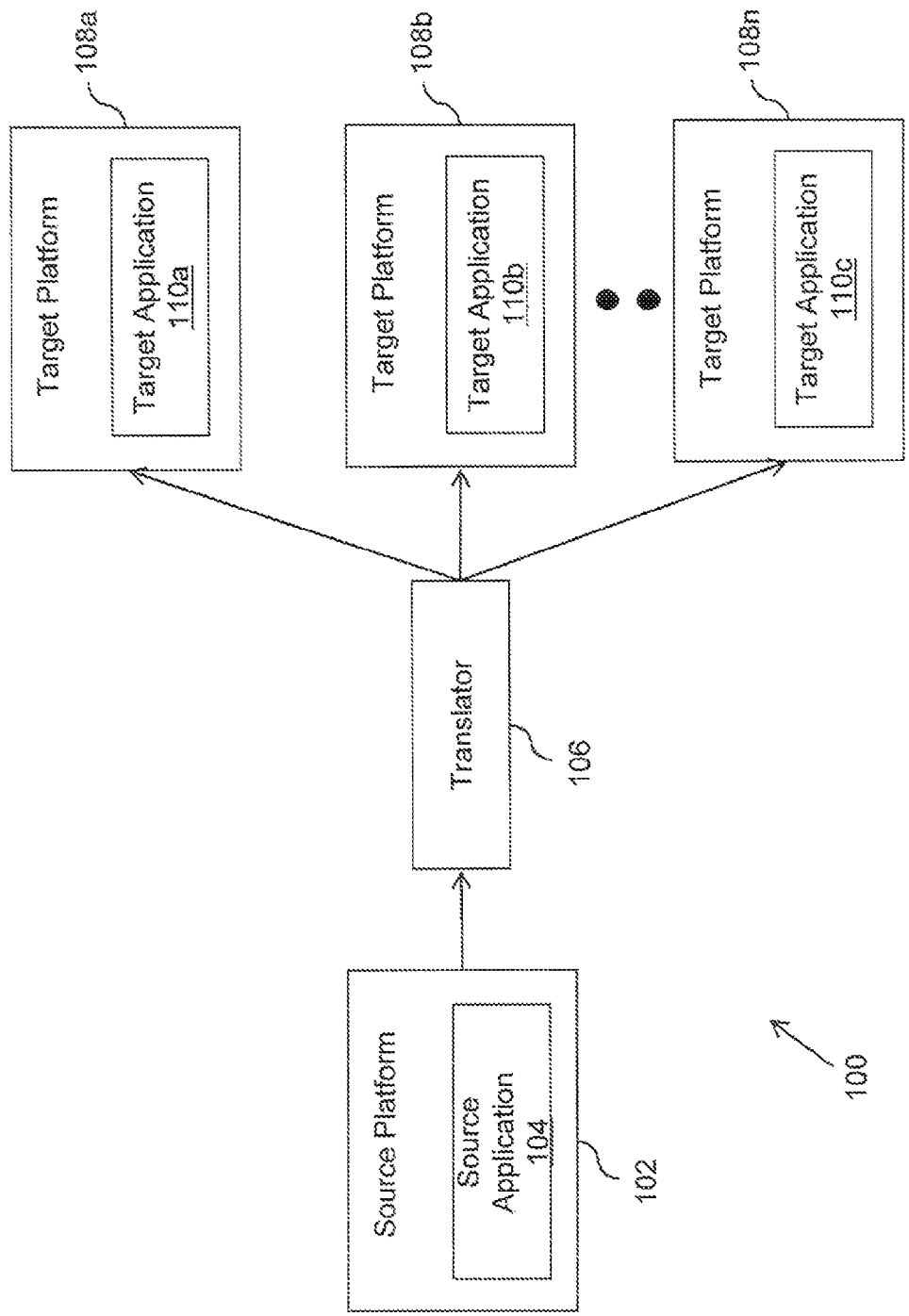
Figure 2:
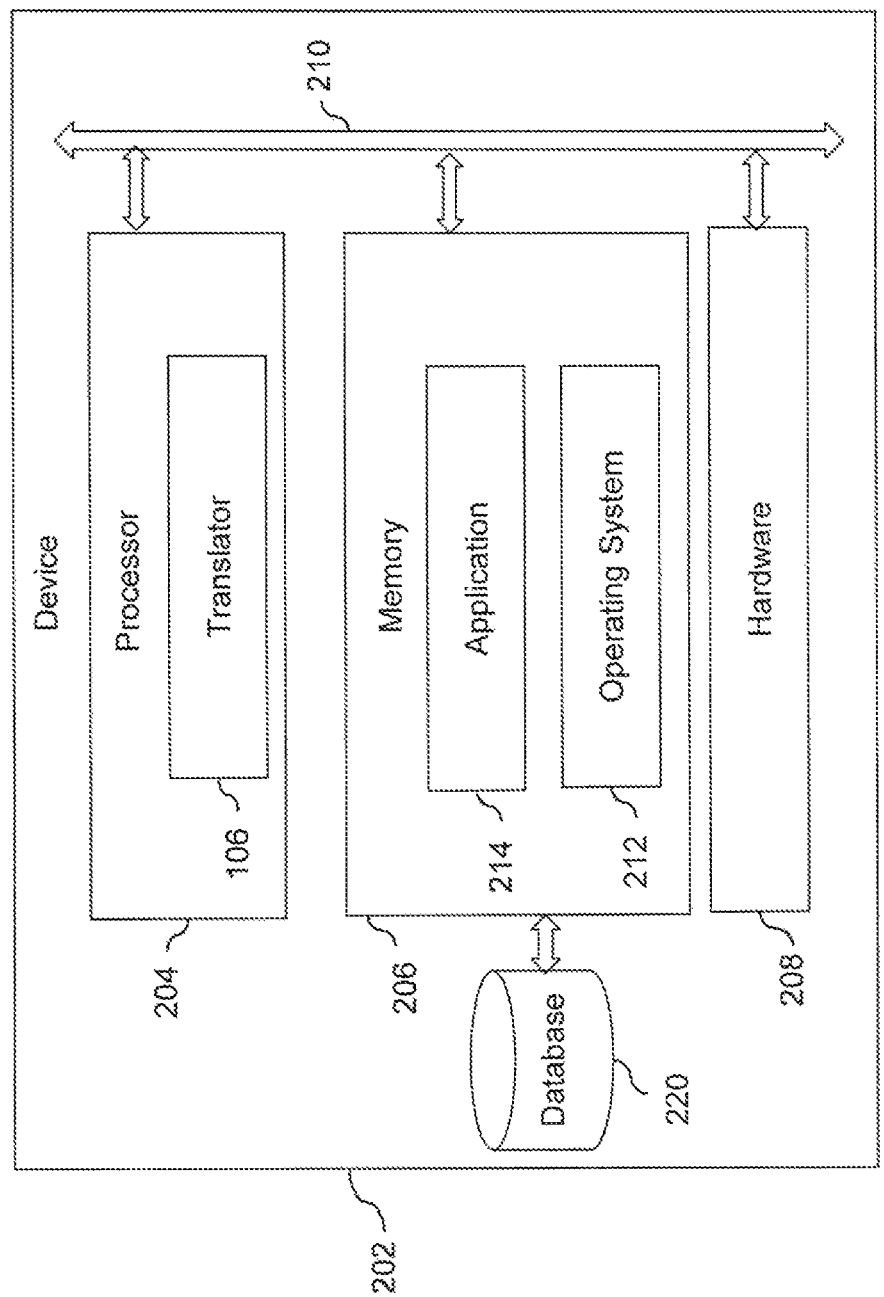
Figure 4A:
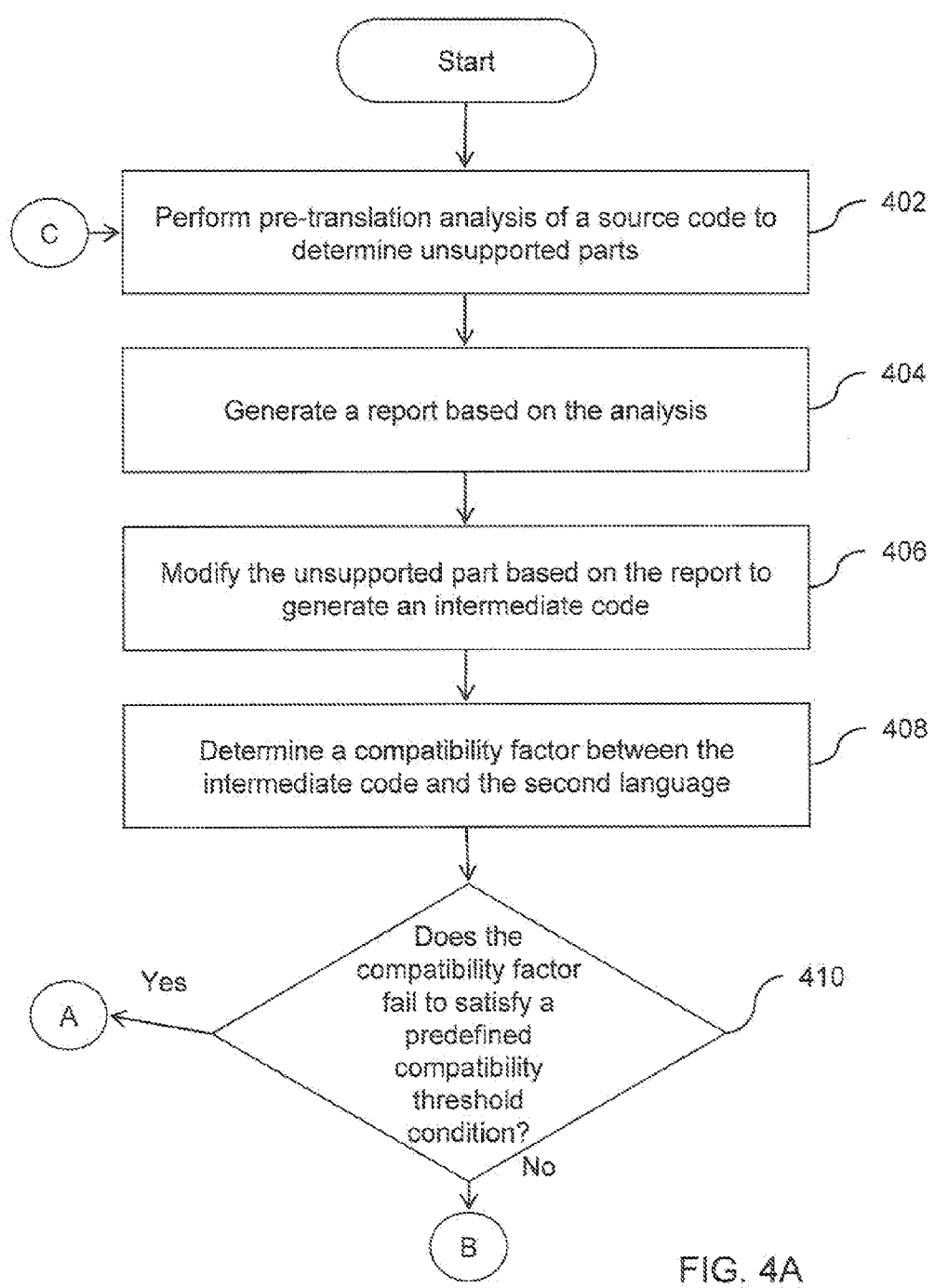
Figure 4B:
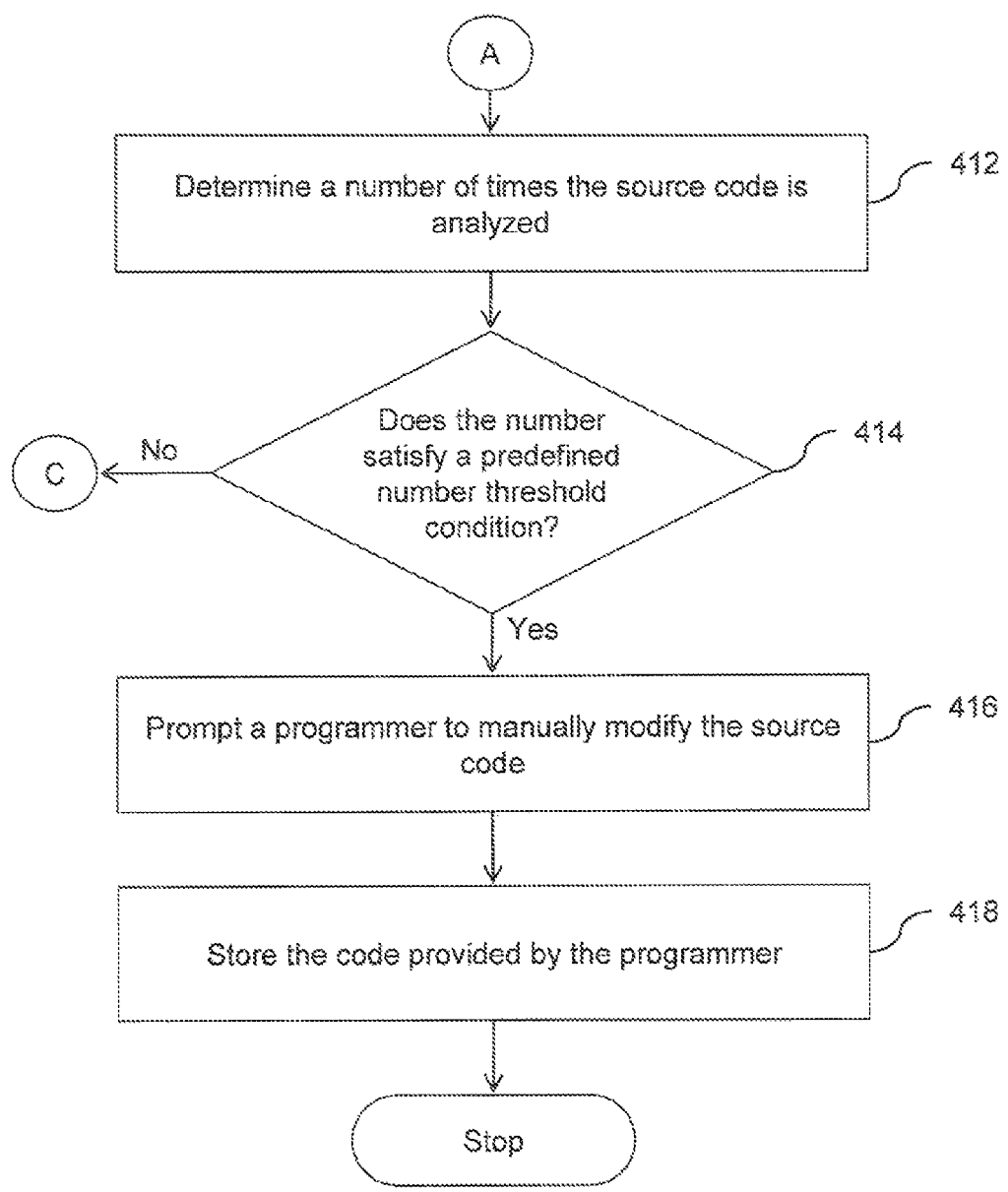
Figure 4C:
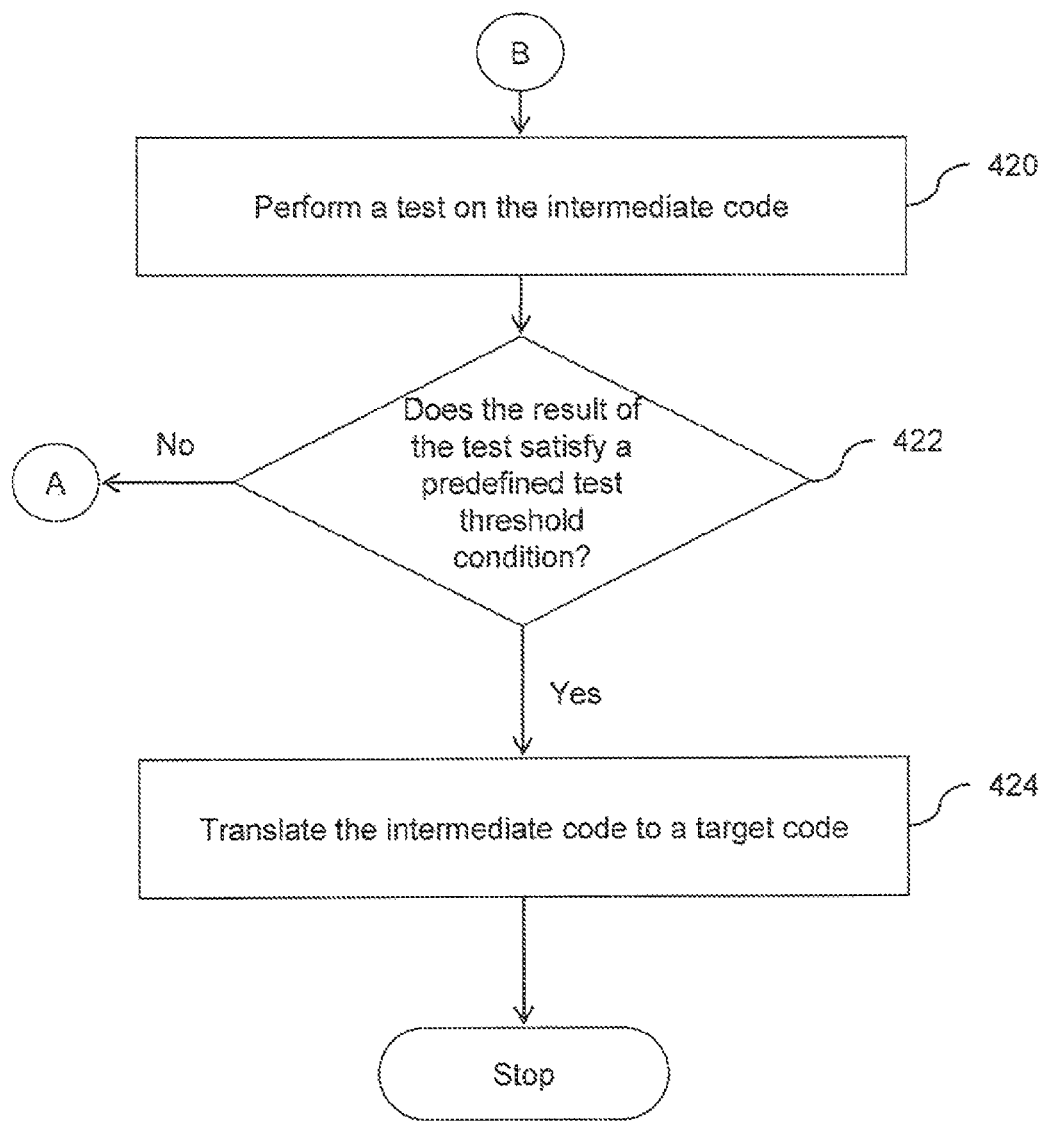

Having thus described the invention in general terms, reference will now be made to the accompanying drawings, which are not necessarily drawn to scale, and wherein:

FIG. 1 illustrates an environment where various embodiments of the invention may function;

FIG. 2 illustrates a block diagram showing exemplary components of an processing device for implementing the invention, in accordance with an embodiment of the invention;

FIG. 3 illustrates various components of a translator for managing translation, in an embodiment of the invention; and FIGS. 4A, 4B, and 4C are flowcharts illustrating a method for managing translation of a source code in accordance with an embodiment of the invention.

DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates an exemplary environment 100 where the embodiments of the invention may function. Generally, computer applications are designed for a particular platform of a device based on the characteristics of the platform. For example, characteristics may include, but are not limited to, the Operating System (OS), processor, memory, display capabilities, audio capability, video capability and so forth. Further, various platforms may only support applications written in specific programming languages. Therefore, the applications may be required to be translated for using them on target platforms. As shown with reference to FIG. 1, a translator 106 may translate a computer source application 104 of a source platform 102 to target application 110a-n of respective target platform 108a-n. Source application 104 may include source code in the form of computer files. Source code can be, for example, instructions written in a programming language, such as, but not limited to, C, C++, JAVA, ASP, or other programming languages.

Typically, all the features or code snippets written in one programming language may not be supported in another programming language. Therefore, a complete source code in a first programming language may not be translated effectively to a target source code in a second programming language. As a result, the computer application may not function as desired or programmed originally. For example, the 'operator overloading' feature of C++ programming language is not supported in JAVA programming language. Similarly, the source code may include multiple parts or code snippets that may not be supported in the target programming language. Therefore, a direct translation may not be possible for this feature. The present invention may enable effective translation of the source code by generating an intermediate code that is supported by the second programming language. The process for managing the translation, according to an embodiment of the invention, is discussed in detail in conjunction with FIGS. 3 and 4.

With reference to FIG. 2, exemplary components of a processing device 202 are illustrated where translator 106 may be implemented. As shown, translator 106 may be a component of device 202; however, a person skilled in the art will appreciate that translator 106 may function as independent hardware, software or firmware. Device 202 may be a computer, a laptop, a mobile phone, a smartphone, and so forth. Further, device 202 may include a processor 204, a memory 206, and hardware 208. Hardware 208 may include various Input/Output (IO) modules, network interfaces, Graphical User Interface (GUI) or other hardware that enable device 202 to connect and/or communicate with other devices, hardware, or users. Memory 206 includes application 214, and an operating system (OS) 212 that supports functioning of various applications on device 202. Examples of OS 212 include, but are not limited to, Windows, Linux, Macintosh, Android, Symbian, and so forth.

Translator 106 may convert a source code of application 214 to an intermediate code. Further, translator 106 may use information stored in a database 220 for the conversion. Database 220 may include information regarding the supported features, unsupported features, multiple code snippets corresponding to the unsupported features, and so forth. Database 220 and the functioning of translator 106 are explained in more detail in conjunction with FIGS. 3 and 4. Examples of memory 206 include a Read Only Memory (ROM), a Random Access Memory (RAM), a hard disk, a solid-state disk or any other media that can store instructions or data. Processor 204 can execute the information or data stored in memory 206. Processor 204, Memory 206 and hardware 208 may communicate with each other through a system bus 210. Although not shown, a person skilled in the art will appreciate that device 202 may include various other components to enable its functioning.

FIG. 3 illustrates components of translator 106, in accordance with an embodiment of the invention. As discussed above, translator 106 can manage translation of a source code from the first programming language to the target code in the second programming language. Translator 106 may include an analysis module 302 that may perform a pre-translation analysis of the source code. In case of pre-translation analysis, the source code may be parsed to analyze multiple parts, such as features or pre-stored code snippets, of the source code. The analyzed parts may be compared to the information in database 220, to determine multiple parts that are not supported in the target programming language. In an embodiment of the invention, analysis module 302 may perform the pre-translation analysis multiple times. Furthermore, analysis module 302 may determine the number of times the pre-translation analysis is performed on the source code. A generator module 304 may generate a report based on the unsupported parts and other information such as for replacing the unsupported parts. For example, the information may be in the form of code snippets.

A modifying module 306 may modify the source code to generate an intermediate code based on the report. For example, modifying module 306 may replace the unsupported parts of the source code with the code snippets to generate an intermediate code. The intermediate code may be in the same programming language as that of the source code, that is, the first programming language. In an embodiment of the invention, a programmer may prepare code snippets for replacing the unsupported parts. Further, the code snippets provided by the programmer may be stored in database 220. Therefore, when a similar unsupported part is found by translator 106, the code snippets provided by the programmer may be used. As a result, translator 106 may update database 220 automatically based on the selection and inputs from the programmer on the report and the source code. Moreover, modifying module 306 may validate the intermediate code by performing a test, and may also determine whether the result of the test satisfies a predefined test threshold condition (such as greater than, less than, or equal to the test threshold, or combinations thereof). The test may be for example, a regression test. Furthermore, modifying module 306 may translate the intermediate code to the target code when the result satisfies the predefined test threshold condition. The translation parameter may be for example, but not limited to, the amount of code, snippets or lines of the source code replaced or modified by modifying module 306. The predefined test threshold of the predefined test threshold condition may be a predetermined value or a dynamically generated value.

Moreover, modifying module 306 may modify the source code multiple times to generate the intermediate code. In an embodiment of the invention, analysis module 302 may re-perform the pre-translation analysis of the intermediate code in the case in which the result fails to satisfy the predefined test threshold condition and a number of pre-translation analyses of the source code are less than a number threshold. For example, pre-translation analysis may be re-performed if the amount of code that is required to be modified is more and the number of times the analysis was performed is less than the number threshold.

Generator module 304 may include a compatibility factor in the report. The compatibility factor may be used to describe a translation compatibility of the intermediate code to the second language. Moreover, the report may include information to optimize the translation of the source code to the target code. The information may include, for example, the location of the unsupported part of the source code and/or the intermediate code.

Further, modifying module 306 may prompt a programmer to manually update the intermediate code, when the compatibility factor fails to satisfy a compatibility parameter threshold condition (such as greater than, less than, or equal to a predetermined compatibility parameter threshold, or combinations thereof). The compatibility parameter threshold may be, for example, a predefined number of lines or code that is supported in the second programming language. Moreover, modifying module 306 may prompt the programmer to manually update the intermediate code if the number of pre-translation analyses of the source code is more than the number threshold. In an embodiment of the invention, modifying module 306 may store the code snippets provided by the programmer corresponding to the unsupported part in database 220. Translator 106 may include a download module 308 that may download the executable instructions for translator 106 to perform the above mentioned processes.

With reference to FIGS. 4A, 4B, and 4C flow diagrams for managing translation of a source code, according to an embodiment of the invention, are depicted. The process depicted can also be implemented in a processing device. Further, it should also be realized that process includes functionality that may be performed in hardware, firmware, software, or a combination thereof, and may further be performed at a single hardware device or a combination of hardware devices at multiple devices. Also, one or more steps of the process can be facilitated by supporting external hardware units.

One may desire to translate the source code in a first programming language of a computer application to a target code in a second programming language. At step 402, a pre-translation analysis of the source code may be performed. The term 'pre-translation analysis' refers to an analysis of the source code that may be done before the actual translation into the target code of the second language. During the pre-translation analysis the source code may be parsed to determine any part, line or code snippet of the source code that is unsupported in the second language. The part of the source code may correspond to, for example, but is not limited to, data types, syntaxes, and application program interface (API) functions. The part of the source code may be compared to an archive of unsupported codes stored in database 220. Moreover, unsupported code may be stored with a corresponding pre-stored code snippets or solutions in database 220. The corresponding solution or pre-stored code may be the codes that were accepted or uploaded by a programmer in database 220. Thereafter, at step 404 a report may be generated based on the pre-translation analysis and the determined unsupported parts. The report may include, for example, but is not limited to, a location of the unsupported part, a description of the unsupported part, a number of occurrences of the unsupported part, or code snippets for replacing the unsupported part. It should be understood by one with ordinary skill in the art that the listed parameters are illustrative examples; additional parameters for optimization of the translation can also be incorporated in the report. Moreover, the report may also be presented to the programmer for his inputs. For example, the report may be displayed on a device of the programmer. Subsequently, at step 406 the unsupported part may be modified based on the report to generate an intermediate code. The intermediate code may be in the first programming language.

Once the unsupported code is modified to generate the intermediate code, the compatibility factor of the intermediate code may be determined at step 408. The compatibility factor may describe a translation compatibility of the intermediate code to the second language. In case, at step 410 if the compatibility factor fails to satisfy the predefined compatibility threshold condition, then the process may continue to step 412 (in FIG. 4B); otherwise if the condition is satisfied, then the process may continue to step 420 (in FIG. 4C).

At step 412, a number of times the source code was been analyzed during a pre-translation phase may be determined. At step 414, if the number is less than a number threshold, then the pre-translation analysis may be re-performed, by proceeding back to step 402. Otherwise, if the number is more than the predefined threshold, then the process may continue to step 416. At step 416, the programmer may be prompted to manually modify the unsupported part to generate the intermediate code. Thereafter, at step 418, the inputs or code snippets provided by the programmer may be stored in database 220. Therefore, whenever a similar type of unsupported part or code is analyzed, then code snippets provided by the programmer may be used to modify the source code and generate the intermediate code.

As discussed above, at step 410, if the compatibility factor satisfied the predefined compatibility threshold condition, then the process may continue to step 420. At step 420, tests may be performed on the intermediate code. For example, the tests may include a series of regression tests on the intermediate code. Thereafter, at step 422, it may be determined if the result of the test satisfies a condition based on a predefined test threshold (such as greater than, less than, or equal to the test threshold, or combinations thereof). If the test results satisfy the condition, then the intermediate code may be translated to a target code in second language, at step 424. Otherwise, the process may proceed back to step 412. Thereafter, the process as discussed above from the step 412 may be performed.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general-purpose computers, special purpose computers, or other programmable data processing apparatus to produce machines, such that the instructions which execute on the computers or other programmable data processing apparatus create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. Furthermore, such computer program instructions may be made available for download and/or downloaded over a communication network.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A method for managing translation of a source code of a computer application in a first programming language to a target code in a second programming language, at a processing device, the method comprising:
    performing a pre-translation analysis of the source code to determine at least a part of the source code that is not supported in the second programming language;
    generating at least one report for indicating one or more modifications to the determined part of the source code;
    modifying the determined part of the source code based on the report generate an intermediate code;
    validating the intermediate code by performing at least one regression test; and
    determining whether at least one result of the at least one regression test satisfies at least one condition based on a predefined test threshold.

2. The method of claim 1, wherein the modifying the determined part comprises replacing the at least a part of the source code that is not supported in the second programming language with one or more code snippets, wherein the one or more code snippets are supported by the second language.

3. The method of claim 2, wherein the one or more code snippets are pre-stored in a database.

4. The method of claim 3, wherein the modifying the determined part further comprises comparing the determined part with one or more snippets stored in the database.

5. The method of claim 1, further comprising:
    translating the intermediate code to the target code, when the at least one result satisfies the at least one condition.

6. The method of claim 1, wherein the at least one predefined test threshold is a predetermined value or a dynamically generated value.

7. The method of claim 1, further comprising:
    re-performing the pre-translation analysis of the intermediate code, if the at least one result fails to satisfy the at least one condition and a number of pre-translation analyses of the source code is less than a predetermined number threshold.

8. The method of claim 1, wherein the report comprises at least one compatibility factor describing a translation compatibility of the intermediate code.

9. A method for managing translation of a source code of a computer application in a first programming language to a target code in a second programming language, at a processing device, the method comprising:
    performing a pre-translation analysis of the source code to determine at least a part of the source code that is not supported in the second programming language;
    generating at least one report for indicating one or more modifications to the determined part of the source code;
    modifying the determined part of the source code based on the report to generate an intermediate code;
    determining whether at least one compatibility factor satisfies at least one condition based on at least one predetermined compatibility parameter threshold;
    determining whether a number of times the source code is analyzed before translation is more than a predetermined number threshold; and
    re-performing the pre-translation analysis on the intermediate code, if the at least one compatibility factor fails to satisfy the at least one condition and the number of pre-translation analyses of the source code is less than the number threshold.

10. The method of claim 9, further comprising:
    prompting a programmer to update the intermediate code, if the at least one compatibility factor fails to satisfy the at least one condition and the number of pre-translation analyses of the source code is more than the number threshold.

11. The method of claim 10, further comprising storing in a database one or more snippets provided by the programmer corresponding to the determined part.

12. The method of claim 1, further comprising:
    downloading executable instructions that, if executed by a device, cause the device to perform said performing, said generating, and said modifying.

13. The method of claim 1, wherein the report comprises information to optimize the translation of the source code to the target code.

14. The method of claim 13, wherein the information includes at least one location of the at least one part of the source code.

15. The method of claim 1, wherein the intermediate code is in the first programming language.

16. A system for managing translation of a source code of a computer application in a first programming language to a target code in a second programming language, the system comprising:

means for performing a pre-translation analysis of the source code to determine at least a part of the source code that is not supported in the second programming language;

means for generating at least one report for indicating one or more modifications to the determined part of the source code;

means for modifying the determined part of the source code based on the report to generate an intermediate code;

means for validating the intermediate code by performing at least one regression test; and means for determining whether at least one result of the at least one regression test satisfies at least one condition based on a predefined test threshold.

17. The system of claim 16, wherein the means for modifying the determined part comprises means for replacing the at least a part of the source code that is not supported in the second programming language with one or more code snippets, wherein the one or more code snippets are supported by the second language.

18. The system of claim 16, wherein the means for modifying further comprises means for selecting one or more snippets for replacement from the report.

19. The system of claim 16, wherein the means for modifying comprises means for enabling a programmer to provide one or more snippets.

20. The system of claim 19, further comprising means for storing one or more snippets provided by the programmer corresponding to the determined part.

21. The system of claim 16, further comprising means for translating the source code to the target code based on the intermediate code.

22. The system of claim 16, wherein the intermediate code is in the first programming language.

23. The system of claim 16, further comprising means for indicating, in the report, at least one compatibility factor describing a translation compatibility between the intermediate code and the target code.

24. A system for managing translation of a source code of a computer application in a first programming language to a target code in a second programming language, the system comprising:

means for performing a pre-translation analysis of the source code to determine at least a part of the source code that is not supported in the second programming language;

means for generating at least one report for indicating one or more modifications to the determined part of the source code;

means for modifying the determined art of the source code based on the report to generate an intermediate code;

means for determining whether at least one compatibility factor meets at least one condition based on at least one predefined compatibility threshold;

means for determining whether a number of times the source code is analyzed before translation is more than a predetermined number threshold; and means for re-performing the pre-translation analysis on the intermediate code, if the at least one compatibility factor fails to satisfy the at least one condition and the number of pre-translation analyses of the source code is less than the number threshold.

25. The system of claim 16, further comprising:

means for downloading executable instructions that, if executed by a device, cause the device to implement one or more of said means for performing, said means for generating, and said means for modifying.

26. The system of claim 16, further comprising means for providing information to optimize the translation of the source code to the target code.

27. The system of claim 26, wherein the information includes at least one location of the at least one part of the source code, and wherein the information is comprised within the report.

28. An apparatus for managing translation of a source code of a computer application in a first programming language to a target code in a second programming language, the apparatus comprising:

a memory for storing one or more code snippets; and a processor communicatively coupled to the memory, wherein the processor is configured to;

perform to pre-translation analysis of the source code to determine at least a part of the source code that is not supported in the second programming language;

generate at least one report for indicating one or more modifications to the determined part of the source code;

modify the determined part of the source code based on the report to generate an intermediate code;

validate the intermediate code by performing at least one regression test; and determine whether at least one result of the at least one regression test satisfies at least one condition based on a predefined test threshold.

29. The apparatus of claim 28, wherein the processor is further configured to:

re-perform the pre-translation analysis on the intermediate code, if at least one compatibly factor fails to satisfy at least one predefined compatibility threshold condition and a number of pre-translation analyses of the source code is less than a number threshold.

30. The apparatus of claim 28, wherein the processor is further configured to translate the intermediate code to the target code, if the at least one result satisfies the least one condition based on the predefined test threshold.

31. The apparatus of claim 28, wherein the report comprises at least one compatibility factor describing a translation compatibility of the intermediate code.

32. An apparatus for managing translation of a source code of a computer application in a first programming language to a target code in a second programming language, the apparatus comprising:

a memory for storing one or more code snippets; and a processor communicatively coupled to the memory, wherein the processor is configured to;

perform a pre-translation analysis of the source code to determine at least apart of the source code that is not supported in the second programming language;

generate at least one resort for indicating one or more modifications to the determined part of the source code;

modify the determined part of the source code based on the report to generate an intermediate code;

determine whether the at least one compatibility factor satisfies at least one predefined compatibility threshold condition;

determine whether a number of times the source code is analyzed before translation is less than a predetermined number threshold; and at least one further operation selected from the group consisting of:

re-performing the pre-translation analysis on the intermediate code, if the at least one compatibility factor fails to satisfy the at least one condition and the number of pre-translation analyses of the source code is less than the number threshold; and prompting a programmer to manually update the intermediate code, if the at least one compatibility factor fails to satisfy the at least one compatibility parameter threshold condition and the number of pre-translation analyses of the source code is more than the number threshold.

33. The apparatus of claim 28, wherein the processor is further configured to provide information for optimizing the translation of the source code to the target code.

34. A non-transitory computer-readable medium having stored thereon instructions that, if executed by a processor, cause the processor to execute operations relating to a method for managing a translation of a source code, in a first language, to a target code, in a second language, the operations comprising:

performing a pre-translation analysis of the source code to determine at least a part of the source code that is not supported in the second programming language;

generating at least one report for indicating one or more modifications to the determined part of the source code;

modifying the determined part of the source code based on the report to generate an intermediate code;

validating the intermediate code by performing at least one regression test; and determining whether at least one result of the at least one regression test satisfies at least one condition based on at least one predefined test threshold.

35. The non-transitory computer-readable medium of claim 34, wherein modifying the determined part of the source code comprises replacing the determined part with one or more code snippets, wherein the one or more code snippets are supported by the second programming language.

36. The non-transitory computer-readable medium of claim 34, wherein the operations further comprise translating the intermediate code to the target code, if the at least one result satisfies the at least one condition.

37. The non-transitory computer-readable medium of claim 34, wherein the operations further comprise:

re-performing the pre-translation analysis of the intermediate code, if the at least one result fails to satisfy the least one condition and a number of pre-translation analyses of the source code is less than the number threshold.

38. The computer-readable medium of claim 34, wherein the report comprises at least one compatibility factor describing a translation compatibility of the intermediate code.

39. A non-transitory computer-readable medium having stored thereon instructions that, if executed by a processor, cause the processor to execute operations relating to a method for managing a translation of a source code, in a first language, to a target code, in a second language, the operations comprising:

performing a pre-translation analysis of the source code to determine at least a part of the source code that is not supported in the second programming language;

generating at least one report for indicating one or more modifications to the determined part of the source code;

modifying the determined part of the source code based on the report to generate an intermediate code;

determining whether at least one compatibility factor satisfies at least one predefined compatibility threshold condition;

determining whether a number of times the source code is analyzed before translation is more than a predetermined number threshold; and re-performing the pre-translation analysis on the intermediate code, if the at least one compatibility factor fails to satisfy the at least one predefined compatibility threshold condition and the number of pre-translation analyses of the source code is less than the number threshold.

40. The non-transitory computer-readable medium of claim 39, wherein the operations further comprise:

prompting a programmer to manually update the intermediate code, if the at least one compatibility factor fails to satisfy the at least one predefined compatibility threshold condition and the number of pre-translation analyses of the source code is more than the number threshold.

41. The non-transitory computer-readable medium of claim 34, wherein the intermediate code is in the first programming language.

* * * * *

UNITED STATES PATENT AND TRADEMARK OFFICE
CERTIFICATE OF CORRECTION

PATENT NO. : 8,533,691 B2
APPLICATION NO. : 13/023678
DATED : September 10, 2013
INVENTOR(S) : Ben-Artzi et al.

Page 1 of 1

It is certified that error appears in the above-identified patent and that said Letters Patent is hereby corrected as shown below:

In the Specification:

In Column 1, Line 53, delete "duo" and insert -- due --, therefor.

In Column 2, Line 14, delete "put" and insert -- put in --, therefor.

In the Claims:

In Column 7, Line 55, in Claim 1, delete "report" and insert -- report to --, therefor.

In Column 9, Line 52, in Claim 24, delete "art" and insert -- part --, therefor.

In Column 10, Line 17, in Claim 28, delete "to;" and insert -- to: --, therefor.

In Column 10, Line 18, in Claim 28, delete "perform to" and insert -- perform a --, therefor.

In Column 10, Line 34, in Claim 29, delete "compatibly" and insert -- compatibility --, therefor.

In Column 10, Line 51, in Claim 32, delete "to;" and insert -- to: --, therefor.

In Column 10, Line 55, in Claim 32, delete "resort" and insert -- report --, therefor.

In Column 12, Line 6, in Claim 38, delete "The" and insert -- The non-transitory --, therefor.

Signed and Sealed this
Twenty-ninth Day of April, 2014

Michelle K. Lee
*Deputy Director of the United States Patent and Trademark Office*